(12) United States Patent
Wernicke et al.

(10) Patent No.: US 8,002,596 B2
(45) Date of Patent: Aug. 23, 2011

(54) HIGH WATER-SPEED TRACKED AMPHIBIAN

(75) Inventors: Kenneth G. Wernicke, Hurst, TX (US); Rodney K. Wernicke, Colleyville, TX (US); Keith H. Wernicke, North Richland Hills, TX (US); Timothy K. Wernicke, Southlake, TX (US)

(73) Assignee: Fast Track Amphibian LLC, Hurst, TX (US)

( * ) Notice: Subject to any disclaimer, the term of this patent is extended or adjusted under 35 U.S.C. 154(b) by 82 days.

(21) Appl. No.: 12/206,320

(22) Filed: Sep. 8, 2008

(65) Prior Publication Data

US 2009/0124142 A1    May 14, 2009

Related U.S. Application Data

(60) Provisional application No. 60/967,858, filed on Sep. 7, 2007.

(51) Int. Cl.
*B60F 3/00* (2006.01)

(52) U.S. Cl. ..................................... 440/12.63; 114/285

(58) Field of Classification Search .................. 114/285, 114/291; 440/12.5, 12.51, 12.54, 12.56, 440/12.63
See application file for complete search history.

(56) References Cited

U.S. PATENT DOCUMENTS

| 3,487,802 | A | * | 1/1970 | Roy | 440/12.54 |
| 3,895,596 | A |   | 7/1975 | Amour | |
| 3,976,025 | A | * | 8/1976 | Russell | 440/12.56 |
| 4,295,834 | A | * | 10/1981 | Buzzi et al. | 440/76 |
| 4,568,294 | A | * | 2/1986 | Owsen | 440/12.63 |
| 4,671,774 | A | * | 6/1987 | Owsen | 440/12.63 |
| 4,961,395 | A | * | 10/1990 | Coast | 440/12.64 |
| 5,027,737 | A | * | 7/1991 | Duffty et al. | 440/12.54 |
| 5,579,711 | A | * | 12/1996 | Thomas | 114/285 |
| 5,628,272 | A | * | 5/1997 | Thomas | 114/285 |
| 5,685,253 | A | * | 11/1997 | Alexander, Jr. | 114/291 |
| 5,765,497 | A | * | 6/1998 | Thomas et al. | 440/12.5 |
| 6,116,972 | A | * | 9/2000 | Bellezza Quater et al. | 440/12.51 |
| 6,135,220 | A |   | 10/2000 | Gleasman et al. | |
| 6,505,694 | B2 |  | 1/2003 | Maguire | |
| 6,554,729 | B2 |  | 4/2003 | Gleasman et al. | |
| 6,666,160 | B1 | * | 12/2003 | Orneblad | 114/291 |
| 6,921,304 | B2 |  | 7/2005 | Hewitt | |
| 6,981,461 | B1 | * | 1/2006 | Burg | 440/12.63 |

FOREIGN PATENT DOCUMENTS

JP    2001-191771        7/2001
SU    1293047 A    *    2/1987

* cited by examiner

*Primary Examiner* — Lars A Olson
(74) *Attorney, Agent, or Firm* — Bracewell & Giuliani LLP (57) ABSTRACT

An amphibious vehicle capable of high speeds on the water has a buoyant hull with driven tracks on each side of the hull. The tracks are movable between an upper position and a lower position relative to the hull. The tracks propel the vehicle both for land travel and water travel. Water diverter vanes at the aft end of each track divert water being carried forward by the tracks. Water diverter vanes at the forward ends direct water carried on the upper runs in a downward and aft direction. A cavitation plate is located behind each of the tracks while waterborne and below the waterline of the hull. A tiltable transom flap is attached to the transom and extends rearward.

31 Claims, 9 Drawing Sheets

HIGH WATER-SPEED TRACKED AMPHIBIAN

RELATED APPLICATIONS

This application claims priority to Provisional Patent Application No. 60/967,858, filed Sep. 7, 2007.

FIELD OF THE INVENTION

This invention related in general to an amphibious vehicle that uses tracks for propulsive force on the water as well as land and provides the potential for operating on the water at high speeds by planing on the water using hydrodynamic (in lieu of buoyancy) lift from the tracks and/or hull to support the weight of the vehicle.

BACKGROUND OF THE INVENTION

Tracked amphibian vehicles were developed prior to World War II and saw much use in the Pacific Theater as an amphibious assault craft that could go ashore and operate on land. Wheeled amphibians such as the "Duck" were also employed in WW II. Those vehicles usually used propellers to help the tracks and wheels on the water and were very slow, with water-speeds less than 10 mph. At the end of the $20^{th}$ century there were still no operational military vehicles that could better the 10 mph water-speed. Snowmobiles with their rubber tracks had been running over the water at high speeds for over 25 years. However, a snowmobile cannot slow down below planing speed or it will sink and it cannot start or stop in the water. Large ships can operate at high speeds without planning because of their large size and the hydrodynamic scaling effects. Small boats, however, can only achieve high speeds efficiently by planing.

At the end of the $20^{th}$ century, the US Navy started the development of a tracked amphibian for the Marine Corps that could get over the hump (the speed at which planing starts) and on to the plane. This vehicle, now called the Expeditionary Fighting Vehicle (EFV), can carry 20 men and weighs 74,500 lbs. It is capable of 29 mph on the water. It is a tracked vehicle that retracts its tracks, folds planing boards out and under the tracks, and uses two large water jets for propulsion on the water. The dual propulsion system of tracks and water jets increases the complexity, cost, weight and maintenance. Introduction of the EFV into military service is dependent on a successful solution of the shortcomings of the production model.

Recently, even higher water-speeds have been achieved with several different experimental amphibious automobiles in the USA and abroad. They retract their wheels, fold out boards under the wheels and use either propellers or water jets for propulsion. Here again they have added complexity because of the dual propulsion system of wheels and water jets, and the wheels, of course, do not provide the all terrain capability of tracks for operating in deep mud, snow, sand, ice, and marshes.

SUMMARY OF THE INVENTION

The tracked amphibian of this invention uses the tracks as the sole means of propulsion for high speed on the water as well as on the land. This feature has the benefit of eliminating the complexity, weight and maintenance of a dual propulsion system. As demonstrated by snowmobiles that can run at high speed (over 80 mph) on the water, propulsion by tracks is very efficient. In fact, the higher the speed the more efficient the tracks become, and they also eliminate hull drag by providing some or all of the lift. The propulsive efficiency of the tracks is given by the ratio of vehicle speed to track speed: Eff=speed of the vehicle/speed of the track (100). For instance a test bed at the speed of 39 mph with a track speed of 48 mph has demonstrated a propulsive efficiency of: Eff=39/48(100) =81%. At 60 mph, efficiency would be even higher (approximately 90%).

If a high water-speed amphibian that uses the tracks as the sole means of propulsion is so advantageous, why have we not had them before? Answer: because tracks have not been found to be good propulsers at lower speeds below the hump. In fact at zero speed, with the tracks submerged in the water, the tracks will re-circulate the water, tending to throw as much water forward as rearward with little forward thrust remaining.

The inventors conducted research with laboratory models, a snowmobile in a hull, a scaled radio controlled model and a full size test bed/concept demonstrator to develop devices and appendages to overcome the re-circulating water problem. The test bed with a 148 horsepower snowmobile engine has achieved the following:

pulled up to two water skiers;
    from a stand still, got on the plane and up to 27 mph with six
        people on board; and
    with one person on board, reached 39 mph on the water and
        65 mph on land.

In this invention the vehicle body or hull is made similar to a boat with a flat or "V" bottom and, in a preferred embodiment, with a step aft of the center of gravity. The track assemblies are positioned as close as possible to the sides of the hull and permitted to move up and down either by swing arms or torsion bars. Vertical travel of the track assemblies is controlled by shock absorbers mounted fore and aft to minimize the jar when passing over bumps on the land and waves in the water. Preferably the steady vertical position of the tracks can be positioned full up or full down or positions in between by specially designed air shock absorbers and air cylinders that use air to push the tracks down or to pull the tracks up. This flexibility permits maximum obstacle clearance on the land and optimizes the relative vertical positioning of the tracks to the hull for optimizing low speed performance or high speed performance or the best wave impact attenuation on the water. Raising or lowering the tracks could also be accomplished with actuation means in a series connection with conventional shock absorbers and springs.

The drive system consists of a gasoline, diesel, engine(s), or hybrid system driving the track sprockets through a transmission that has several gear ratios, or preferably uses an automatic transmission, a continuously variable transmission (CVT), or an infinitely variable transmission (IVT). The side axle shafts to each sprocket utilizes U- or CV-joints to permit the up and down travel of the track assemblies. A steering system is integrated with the drive system to permit slowing down or stopping one track while the other track speeds up. This can be done with brakes, or brakes and clutches, a "triple differential" as used on tanks, or mixing a steering input from a hydraulic or electric motor with the power input via planetaries at each side axle, or by other means.

Devices and appendages can be used individually or collectively to overcome the re-circulation of water and loss of thrust in the water when at low speed or at a stand still. A preferred embodiment includes diverter vanes at the aft end near the top of the tracks to direct the water aft when going forward and at the front of the tracks to direct the water forward when backing up. A transom flap can be positioned to optimize hull lift and trim on the water. The transom flap can be raised for obstacle clearance on the land. Cavitation plates behind the tracks can be used to help when starting on the water with the tracks full down, but they would have to be retracted for obstacle clearance when backing on land.

For simplicity of operation, the vertical position of the tracks can be set in one position and left for operation in the water. Full up position gives the best performance, except at high speeds on the water where full down would lift the hull completely out of the water. The full down position with the tracks would also give the best mitigation of wave impact. Pulling the tracks full up is optimum for starting on the water.

DETAILED DESCRIPTION OF THE INVENTION

Figure 1:
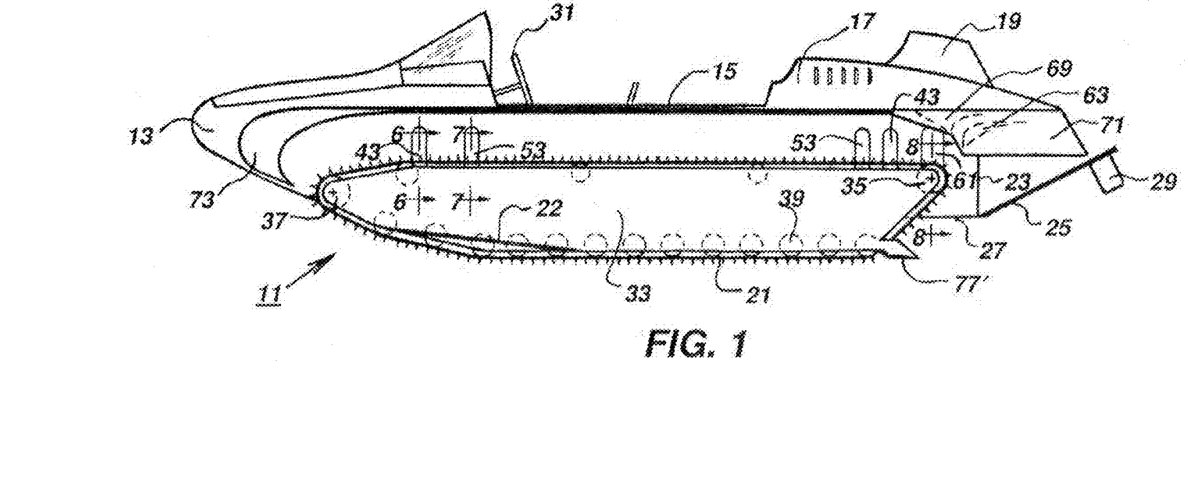
FIG. 1 is a side elevational view of an amphibious vehicle constructed in accordance with this invention.
Figure 2:
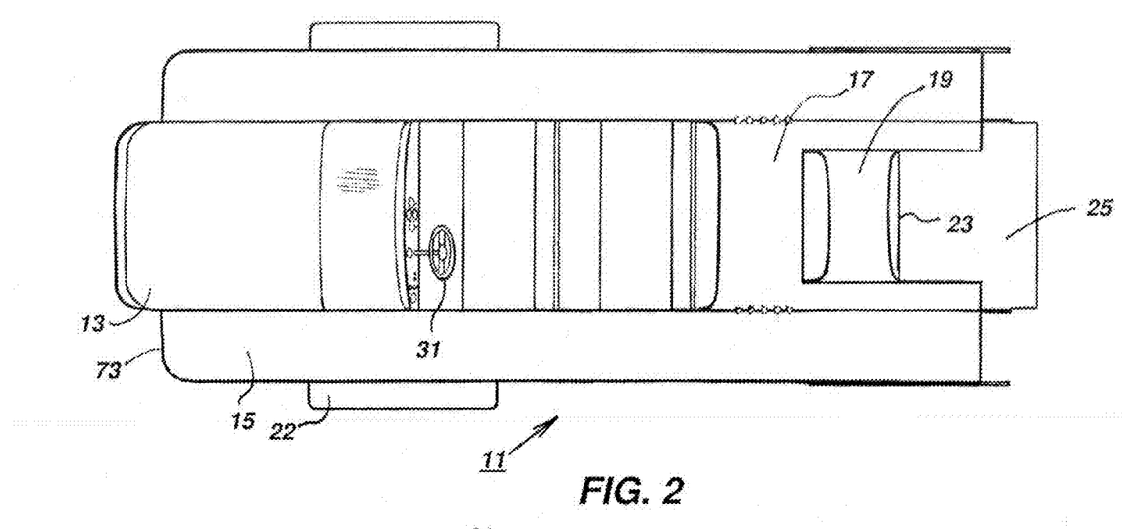
FIG. 2 is a top plan view of the vehicle of FIG. 1.

Referring to FIG. 1, vehicle 11 has a buoyant hull 13. In this embodiment, fenders 15 are mounted to hull 13 on each side. An engine is located in the aft portion of hull 13 and enclosed by an engine cowling 17. A radiator air scoop 19 serves as an air intake for cooling the radiator of the engine.

A continuous rotatable track 21 is mounted to each side of hull 13. Tracks 21 provide propulsion for hull 13 not only on land but also when water borne. A side splash plate 22 may be mounted to an outboard side of each track 21 for restricting water spray while under high forward speed in water. Splash plates 22 are located forward of the mid point along the length of vehicle 11.

Figure 15:
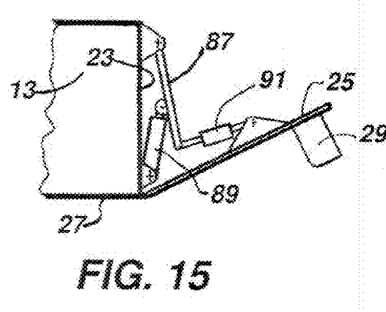
FIG. 15 is a partial elevational view of the vehicle of FIG. 1, illustrating the transom flap being folded upward to a storage position.

Hull 13 has a transom 23, which is generally perpendicular to fenders 15 in this embodiment. A transom flap 25 is mounted by a hinge to the bottom of transom 23. Transom flap 25 extends rearward from transom 23. Transom flap 25 has a storage position inclined upward as shown in FIG. 15, and an operational position shown in FIG. 16. In the operational position, flap 25 is generally perpendicular to transom 23 and parallel to bottom 27. One or more rudders 29 may be mounted to transom flap 25 for steering vehicle 11 while water borne.

In this embodiment, vehicle 11 has a steering control device that may be a steering wheel 33 similar to an automobile steering wheel or some other type of member for gripping by a driver. Steering wheel 31 provides steering through tracks 21 while on land and provides additional steering through rudder 29 while water borne. Each track 21 is mounted around an elongated track support frame 33. Each track support frame 33 provides supporting structure for one of the tracks 21. Preferably, each track support frame 33 contains buoyant material such as a closed cell foam. A plurality of drive sprockets 35 are mounted in line with each other (only one shown in FIG. 1) at the aft upper end of each track support frame 33. Track sprockets 35 are driven to cause rotation of each track 21 about the track support frame 33 on which it is mounted. A plurality of forward bogie wheels 37 (only one shown in FIG. 1) are mounted at the forward end of track support frame 33. Also, a number of intermediate bogie wheels 39 are spaced along the lower run and the upper run of track 21. Bogie wheels 39 are rotatably mounted to track support frame 33. Bogie wheels 37 and 39 are not driven but rotate in response to movement of track 21.

Figure 3:
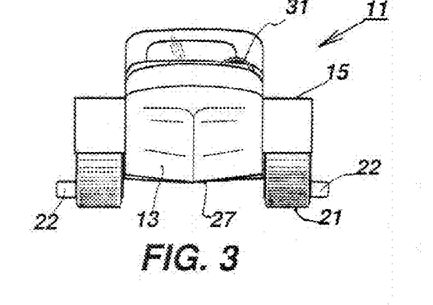
FIG. 3 is a front elevational view of the vehicle of FIG. 1, with the tracks in a lower position relative to the hull.
Figure 4:
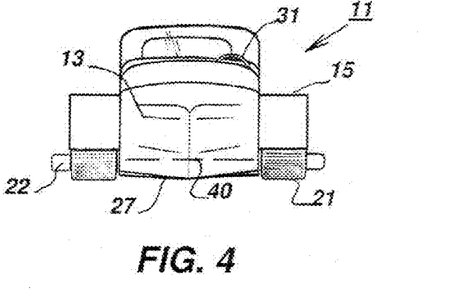
FIG. 4 is a front elevational view of the vehicle of FIG. 1, showing the tracks in an upper position relative to the hull.

Referring to FIGS. 3 and 4, tracks 21 and hull 13 are vertically movable relative to each other from the position shown in FIG. 3 to the position shown in FIG. 4. The position shown in FIG. 3 is a typical position while operating on land. The lower runs of tracks 21 extend a substantial distance below bottom 27. Bottom 27 is thus a good distance above the ground for clearance. In FIG. 4, tracks 21 are substantially flush with the portion of hull bottom 27 after a step 81 (subsequently discussed). This upper position for tracks 21 is particularly useful for slow speed water borne operation and can also be used at higher speeds. If desired, at high speeds, however, tracks 21 can be extended lower to lift the forward portion of hull 27 above the water. While planning, hydrodynamic lift is provided by the tracks and/or hull to support the weight of the vehicle.

Figure 5:
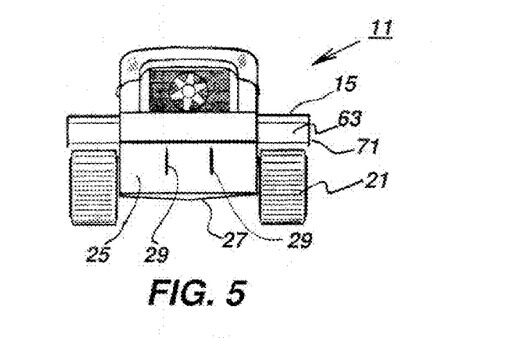
FIG. 5 is a rear view of the vehicle of FIG. 1 showing the tracks in a lower position relative to the hull.

FIG. 4 shows a water line 40, which would be a typical point at which vehicle 11 will float when not being powered and in calm water. Water line 40 is located a short distance, such as eight to ten inches, above the lower run of each track 21 while tracks 21 are in the upper position of FIG. 4 and the vehicle stationary in calm water. FIG. 5 illustrates vehicle 11 while tracks 21 are in the lower position and shows the rear of vehicle 11. Note that in this example, there are two rudders 29.

Figure 6:
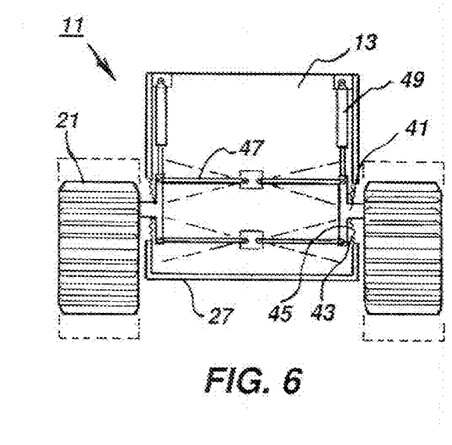
FIG. 6 is a simplified sectional view along the line 6-6 of FIG. 1, with some components removed for clarity to illustrate the air cylinders for moving the tracks to the upper position.

A variety of devices may be employed to move tracks 21 from the lower position of FIG. 3 to the upper position of FIG. 4. FIG. 6 shows two support arms 41, each extending inward from one of the support frames 33. Although only two are shown, there are four support arms 41, two at the front and two at the aft end of frame 33. In this embodiment, each support arm 41 is generally T-shaped, having a horizontal leg that is rigidly attached to track support frame 33 (FIG. 1). The horizontal leg of each support arm 41 extends through a vertical slot 43 (FIG. 1) within a side of hull 13. A boot 45 is sealed around the horizontal leg of support arm 41 and sealed to slot 43 to prevent the entry of water. Support arm 41 has a vertical leg located within hull 13. The vertical legs of each support arm 41 are attached to the hull 13 with tie rods 47 to permit vertical motion of track support frame 33.

A pneumatic cylinder 49 is mounted between an upper portion of hull 13 and an upper portion of the vertical leg of support arm 41. Although only two pneumatic cylinders 49 are shown, four are employed, two at the front and two near the aft end of tracks 21. When air pressure is applied to air cylinders 49, they will pull tracks 21 upward relative to hull 13 to the upper position of FIG. 4.

Figure 7:
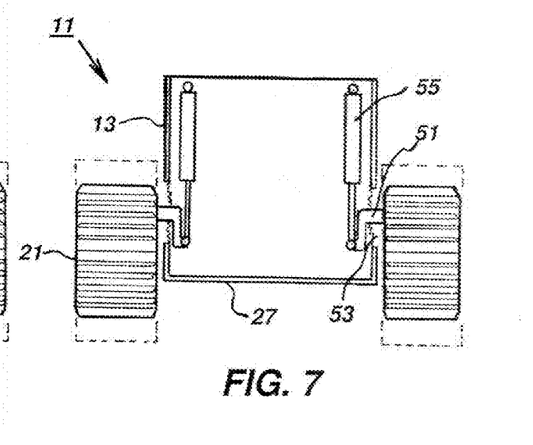
FIG. 7 is a simplified sectional view taken along the line 7-7 of FIG. 1, with some components removed for clarity to illustrate the shock absorbers.

Referring to FIG. 7, a support arm 51 extends through each vertical slot 53 and is attached to track support frame 33 (FIG. 1). Two support arms 51 are located forward and two aft. In this embodiment, each support arm 51 has a downward extending portion with a clevis on the lower end. A conventional automobile air shock absorber 55 is mounted between the clevis at the lower end of each support arm 51 and an upper portion of frame 13. Shock absorber 55 provides a shock absorbing function the same manner as a motor vehicle. In addition, when the air pressure in shock absorber 55 is increased, it will push tracks 21 from the upper position in FIG. 4 to the lower position in FIGS. 3 and 5. When air cylinders 49 (FIG. 6) are lifting tracks 21, air within shock absorbers 55 bleeds out. Elastomeric boots similar to boots 45 (FIG. 6) seal around each arm 51.

Figure 8:
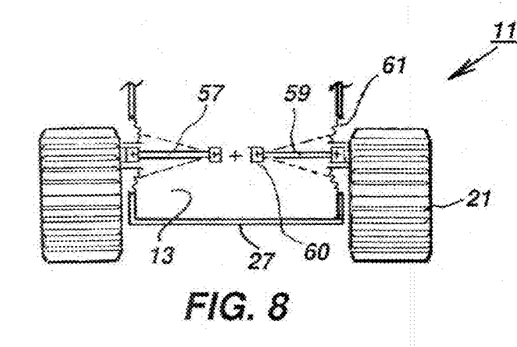
FIG. 8 is a simplified sectional view, taken along the line 8-8 of FIG. 1 and illustrating the drive shafts for the tracks.

Referring to FIG. 8, which is a simplified sectional view through sprocket 35 (FIG. 1), a separate drive shaft 57 and 59 is coupled to each track 21 for driving each track 21. Drive shafts 57, 59 are able to pivot at their inner and outer ends as tracks 21 move between the upper and lower positions, as shown by the dotted lines. Each drive shaft 57, 59 extends through a vertical slot 61 and is sealed by a rubber boot similar to rubber boot 45 (FIG. 6). Conventional CV joints 60 are connected to the ends of each shaft 57, 59. As shown by the dotted lines in FIG. 8, CV joints 60 accommodate the driving of tracks 21 whether in the upper or the lower position.

Figure 10:
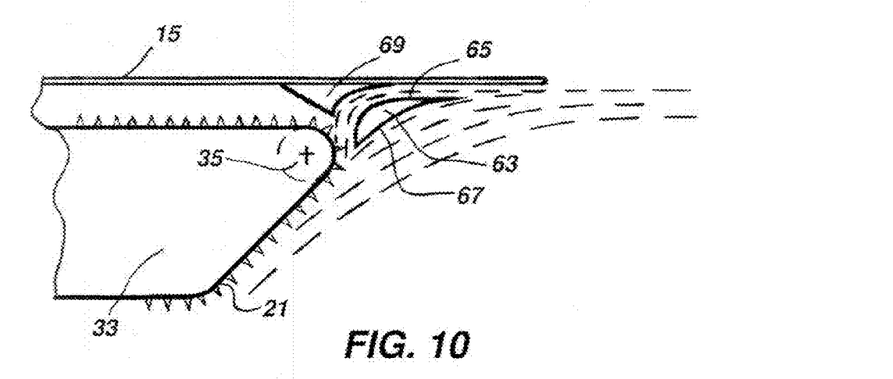
FIG. 10 is a partial sectional view of a rear portion of one of the tracks of the vehicle of FIG. 1, showing the track in the upper position and the aft vane skirt removed to illustrate the aft water diverter vanes.

Referring to FIG. 10, while water borne and moving, a considerable amount of water is entrained outside of the cleats of tracks 21. If not prevented, a large amount of the water will be carried forward by the upper runs of tracks 21 and discharged forward of the vehicle, inhibiting forward movement. An aft water diverter vane 63 is mounted above and aft of each drive sprocket 35 to reduce the amount of water carried forward by the upper run of track 21. In this embodiment, aft vane 63 has a lower side that is slightly concave and generally tangent with the cleats of track 21 as track 21 rounds the lower side of sprockets 35. The aft run of a portion of track 21 may be at various angles but in this embodiment, it is about 45°. Aft vane 63 also has an upper convex side 65 for diverting water from track 21 over the convex side and aft.

In addition, a second aft water diverter vane 69 may be mounted above and forward of aft vane 63. Aft vane 69 has a concave rearward facing side that is generally parallel with the convex upper side 65 of vane 63. The space between vanes 63 and 69 is a generally constant width curved channel to capture and cause water to be discharged aft of the vehicle.

In this embodiment, vanes 63 and 69 are mounted to a vane skirt 71 that extends outward from hull 13. Consequently, vanes 63, 69 are in the desired position for diverting water only when tracks 21 are moved to the upper position. In an alternate embodiment, vanes 63, 69 may be mounted for movement with track support frame 33 as it moves between the upper and lower positions.

Figure 9:
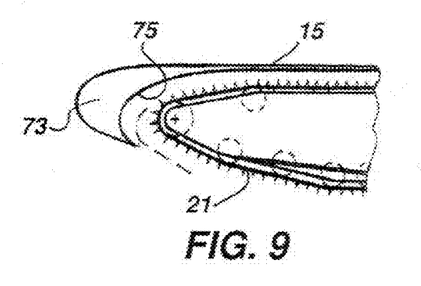
FIG. 9 is a side elevational view of a front portion of one of the tracks of the vehicle of FIG. 1, showing the track in the upper position, and illustrating the forward water-diverter vane.

Referring to FIG. 9, a forward water diverter vane 73 is located forward of track 21. Forward vane 73 has a curved inner or rearward side 75 that is concave and matches generally the contour of the forward end of track 21. This results in an approximately constant-width channel between track 21 and forward vane 73. The channel causes water to be diverted downward as it flows from the upper run of track 21 forward. In this embodiment, forward vane 73 forms the forward edge of fender 15 and thus is fixed to hull 13. The position shown in FIG. 9 occurs only when tracks 21 are elevated to the upper position. In an alternate embodiment, forward vanes 73 could move upward and downward with tracks 21.

Figure 11:
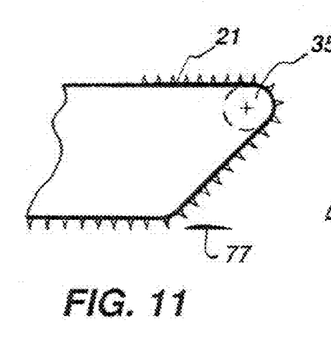
FIG. 11 is a schematic view of a rear portion of one of the tracks of the vehicle of FIG. 1, illustrating a first embodiment of a cavitation plate.

Referring to FIG. 11, a cavitation plate 77 is mounted to track support frame 33 for movement therewith between the upper and lower positions. Also, preferably cavitation plate 77 is pivotal to a storage position for land operation. While water borne, cavitation plate 77 in the embodiment of FIG. 11 is generally parallel with the lower run of track 21. Cavitation plate 77 improves the performance of vehicle 11 by stripping the entrained water from track 21 as it goes around the aftermost bogie 39, greatly reducing the amount of recirculated water.

Figure 12:
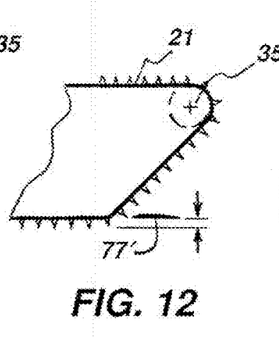
FIG. 12 is a schematic view similar to FIG. 11, and illustrating a second embodiment of a cavitation plate.
Figure 13:
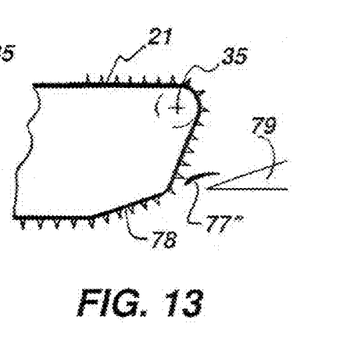
FIG. 13 is another schematic view similar to FIG. 11, but illustrating a modified track and a third embodiment of a cavitation plate.

In FIG. 12, cavitation plate 77' is similar to that in FIG. 11 but is located a short distance above the lower run of track 21. In FIG. 13, the track support frame has an aft section with a lower portion 78 extending at an angle 79 that is less than 45°, which is the angle of the aft sections of the track support frames in FIGS. 11 and 12. One preferred angle 79 is about 19°. The upper aft portion above lower aft portion 78 slopes at a much steeper angle. Cavitation plate 77" is located aft and slightly above lower aft portion 78.

Figure 14:
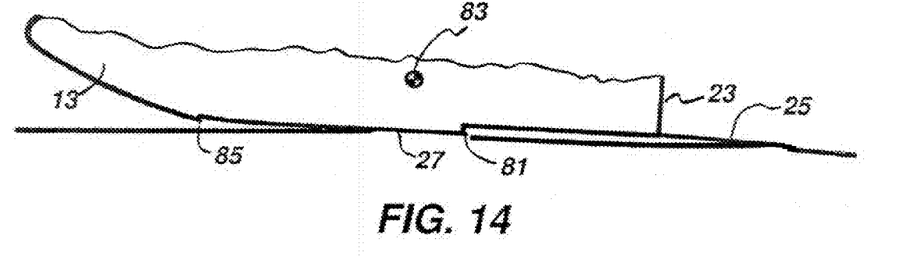
FIG. 14 is a partial sectional view of the bottom of the hull of the vehicle of FIG. 1, illustrating steps on the bottom.

Referring to FIG. 14, hull 13 may have a V-shaped bottom 27 similar to planing motor boats. Bottom 27 preferably has a step 81 that is rearward facing and located forward of transom 23 and rearward of the center of gravity 83. A second and smaller step 85 may be located forward of the vehicle center of gravity 83. The fore and aft placement of step 83 is important in achieving the maximum forward speed, considering the center of gravity 83. The center of gravity 83 is positioned so as to give good steering and driving characteristics while on land. There is a range of the center of gravity 83 that varies depending on the position and weight of the passengers and load. The most aft position of step 81 is determined so as to put the center of lift of the planning surface ahead of the most forward center of gravity 83 when the wetted length of hull 13 is as short as it will get at the highest forward speed possible. It is necessary to keep the lift that is produced ahead of step 81 forward of center of gravity 83 so it will tend to make hull 13 nose up until transom flap 25 touches the water, as shown in FIG. 14. Transom flap 25 will dampen pitching motion of hull 13.

A hydrofoil placed aft of transom 23 could be used in place of transom flap 25 to act as a damper. A more forward location of step 81 from the most aft position will place more of the lift on transom flap 25 with a slight increase in drag. The determination of the wetted length and center of lift is done with calculating methodology for planning boats or it can be determined by experiment.

Figure 16:
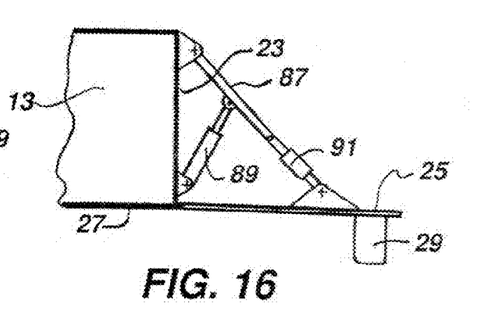
FIG. 16 is a view similar to FIG. 15, but illustrating the transom flap in an operational position.

FIG. 15 shows transom flap 25 in a position partially between the operational position shown in FIG. 16 and a storage position (not shown). Various devices may be employed to raise and lower transom flap 25. In this embodiment, a linkage 87 extends between transom flap 25 and transom 23. Linkage 87 is moved between a contracted position and the extended position of FIG. 16 by a pneumatic cylinder 89. Additionally, a fine adjustment 91 may be connected into linkage 87 for increasing and decreasing the length of linkage 87 in small increments. While in the operational position, transom flap 25 is generally perpendicular to transom 23, but may be trimmed a few degrees up and downward by trim adjustment 91 to trim the inclination of hull 13 as it is planning. Trim adjustment could be accomplished by the retraction means if the pneumatic cylinder 89 is replaced by another device, such as a screw jack assembly.

Figure 17:
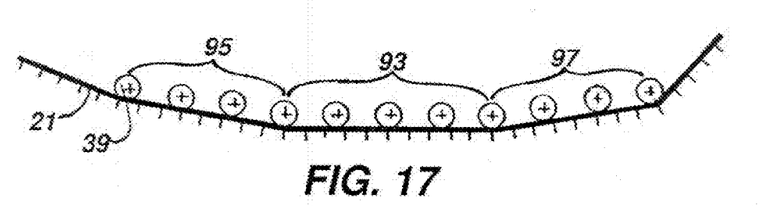
FIG. 17 is a schematic view illustrating a lower run of one of the tracks of the vehicle of FIG. 1.

FIG. 17 illustrates the lower run of track 21 in more detail. Although the lower run could be completely in a single plane, if so, when turning during land travel at slow speeds, quite a lot of the track will scrape across the earth's surface. To reduce the amount of scraping, a central portion 93 is in a horizontal plane in contact with the ground surface. A forward portion 95 extends in a single plane at an angle of about 1-3° relative to central portion 93. An aft portion 97 extends aft from central portion 93 in a single plane but at an inclination of about 1-3° relative to central portion 93. In the preferred embodiment, the central portion 93 has a length approximately the same length as aft portion 97 and as forward portion 95. Preferably, central portion 93, which is the ground contacting portion, is no more than 30-50% of the length from the forward end of forward portion 95 to the aft end of aft portion 97.

Figure 18:
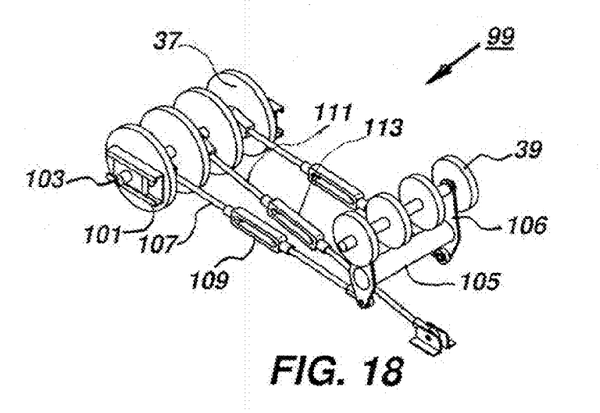
FIG. 18 is a perspective view showing a tensioning mechanism for one of the tracks of the vehicle of FIG. 1.

FIG. 18 illustrates a tension adjusting device 99 for applying tension to one of the tracks 21. Each track 21 preferably has an identical tension adjusting device 99. Each adjusting device 99 includes a pair slide brackets 101 mounted to opposite sides of one of the track support frames 33 (FIG. 1). A forward axle 103 is slidably mounted between slide brackets 101. Forward axle 103 supports the forward bogie wheels 37, which are spaced apart and parallel to each other. Bogie wheels 37, as shown in FIG. 1, are located at the forward end of track 21. Axle 103 is able to slide forward and rearward in brackets 101 to tension track 21.

So as to maintain proper alignment of bogie wheels 37 and prevent track 21 from running to one side or the other, torque tube 105 is located aft of axle 103 and connected by tie rods 107. Turn buckles 109 are mounted on tie rods 107 between brackets 106 and forward axle 103. Adjusting turn buckles 109 aligns shaft 103 parallel with torque tube 105. A bracket 106 extends upward from each side of torque tube 105, supporting torque tube 105 about the non-rotating axle of bogie wheels 39. The axle of bogies wheels 39 is fixed between sides of track support frame 33 (FIG. 1).

The forward and rearward movement of axle 103 is caused by tie rod 111, which has a turn buckle 113 and an aft end that is attached to track support frame 33 (FIG. 1). Adjusting turn buckle 113 slides axle 103 and pivots torque tube 105 forward and rearward in unison with each other.

Figure 19:
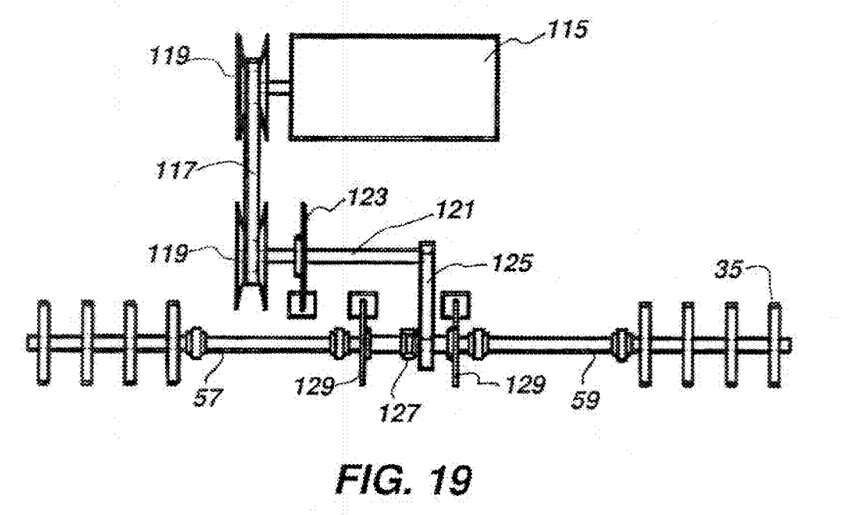
FIG. 19 is a schematic view illustrating components of the drive, braking and steering system for the vehicle of FIG. 1.

FIG. 19 schematically illustrates a drive, braking, and steering system for the vehicle. An engine 115 provides power through a belt 117 extending between pulleys 119. Pulleys 119 are variable in diameter. As the flanges of a pulley 119 move toward and away from each other, the effective diameter increases and decreases, thus varying the output speed on main drive shaft 121. A main brake 123, when actuated, will slow or stop movement of main drive shaft 121. Main drive shaft 121 is connected through a drive chain 125 to a differential 127. Differential 127 will rotate each drive shaft 57, 59 independently of the other. A caliper steering brake 129 is mounted to each drive shaft 57, 59. Actuating one steering brake 129 will stop or slow movement of the particular drive shaft 57 on which it is mounted. Stopping or slowing movement of one drive shaft 57 or 59 relative to the other causes the vehicle to turn, thus providing steering. Steering with tracks 21 (FIG. 1) is performed both while on land and on water. Rudders 29 (FIG. 1) augment the steering with tracks 21 while on water.

Figure 20:
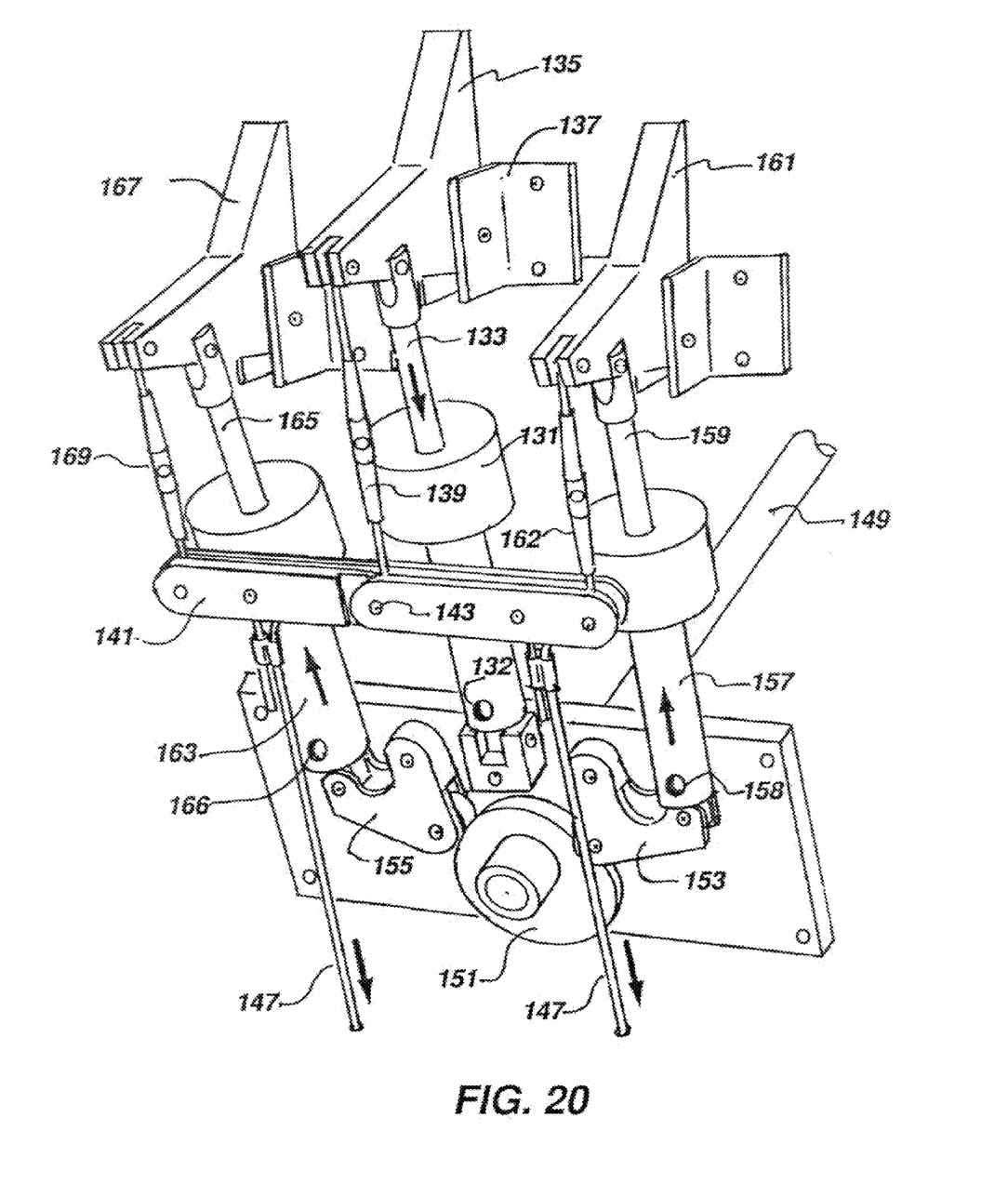
FIG. 20 is a perspective view illustrating another portion of the steering and braking system for the vehicle of FIG. 1.

FIG. 20 illustrates an interface mechanism between steering wheel 31 (FIG. 1) and the brake pedal (not shown) to the system shown in FIG. 19. The braking system includes a main brake master cylinder 131 that has an output port 132 that supplies pressure to the main brake 123 (FIG. 19) to stop movement of main drive shaft 121. Main brake master cylinder 131 has a piston 133 that when pushed downward causes hydraulic flow to be output from port 132. The upper end of piston 133 is connected to a pivotal bell crank 135 mounted to a hinge bracket 137 within the hull of the vehicle. A link 139 connects an end of bell crank 135 to a whiffle tree 141. Whiffle tree 141 is a linkage member that has a central pivot point 143. Brake cables 147 extend downward from opposite sides of whiffle tree 141. Brake cables 147 extend to the main brake pedal (not shown).

A steering shaft 149 extends from steering wheel 31 (FIG. 1) and is rotated in unison with steering wheel 31. A cam 151 is mounted to the end of steering shaft 149. Cam 151 has lobes on its exterior that are at different distances from the axis of steering shaft 149. Two cam followers 153 and 155 are mounted in rolling engagement with the lobes of cam 151. When cam follower 153 moves upward, which occurs in response to engaging a lobe on cam 151, it will move a first steering master cylinder 157 upward. A piston shaft 159 extends from first steering master cylinder 157 and into engagement with a bell crank 161. Bell crank 161 is also pivotally mounted by a bracket to the vehicle. Bell crank 161 is connected to the outer end of whiffle tree 141 by a link 162. If link 162 is not moving, then bell crank 161 will be stationary as well as piston rod 159. Upward and downward movement of first steering master cylinder 157 in response to cam follower 153 will vary hydraulic fluid pressure through output port 158 to one of the brakes 129. That will result in one of the tracks 21 (FIG. 1) slowing or stopping relative to the other. If an output pulse from port 158 is connected to the brake 129 of drive shaft 59 (FIG. 19), drive shaft 59 will slow or stop relative to drive shaft 57.

Similarly, a second cam follower 155 is connected to a second steering master cylinder 163 that has a piston 165. Second master cylinder 163 has an output port 166 that is connected to the other steering brake 129 (FIG. 19). Bell crank 167 is pivotally mounted to the vehicle and coupled to the upper end of piston 165. A link 169 extends from bell crank 167 to the opposite end of whiffle tree 141 from linkage 162.

Braking is executed by depressing the brake pedal (not shown), which pulls downward on brake cables 147. Each cable 147 moves downward the same amount. This action pulls the three pistons 133, 159, and 165 downward in unison and produces virtually equal pressures in all three cylinders 131, 157, 163. Main brake master cylinder 131 provides via output port 132 pressure to master brake 123 (FIG. 19). Second steering master cylinder 163 provides via output port 166 pressure to one of the brakes, such as brake 129 of shaft 57. In a like manner, first steering master cylinder 157 provides pressure to the brake caliper 129 on shaft 59. Thus, all three brakes 123, 129, are actuated by movement of the brake pedal.

Steering is executed by rotating steering shaft 149 clockwise or counterclockwise with steering wheel 31 (FIG. 1). For example, to make a left turn, steering shaft 149 is rotated clockwise, causing cam 151 to force cam follower 155 to rotate clockwise, thus raising second steering master cylinder 163. The resulting pressure is transmitted via port 166 to steering brake 129 on the left track, which one may assume to be driven by drive shaft 57 (FIG. 19). This causes the left track 21 to slow or stop, resulting in the vehicle turning left. Similarly, right turns are accomplished by counterclockwise rotation of shaft 149, actuating first master cylinder 157.

Braking can also be accomplished while steering with the arrangement shown in FIG. 20. Starting with the left turn described above, pressure in second steering master cylinder 163 prevents piston 165 from moving, thus link 169 prevents downward motion of the left end of whiffle tree 141. Floating pivot point 143 moves downward twice as much as brake cable 147. All tension would be on the left brake cable 147, as viewed in the drawing, while the right brake cable 147 would be limp. The same would occur when steering to the right, allowing one to apply the main brake while steering.

Figure 21:
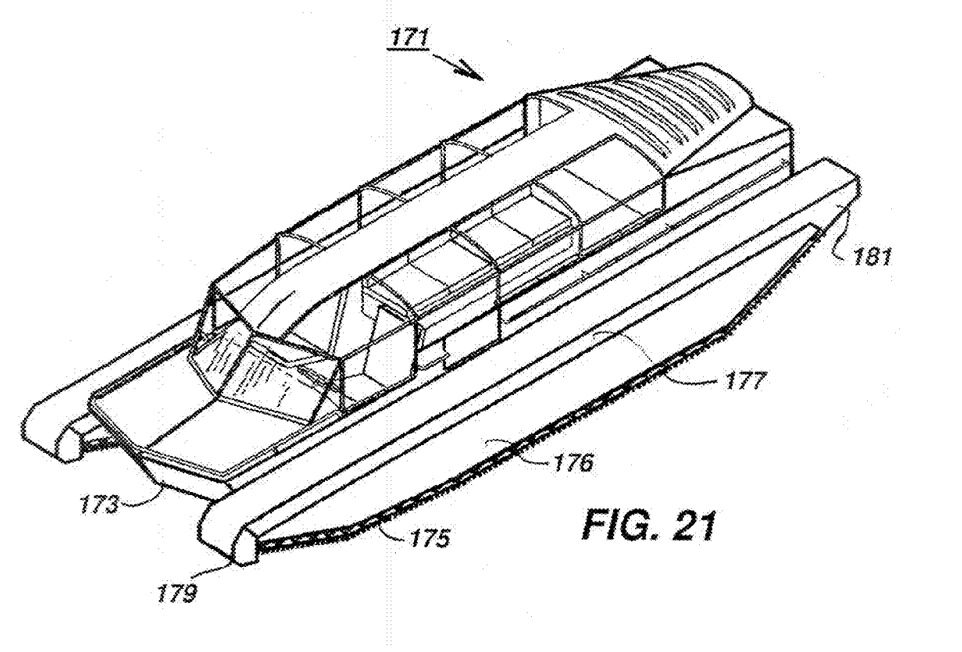
FIG. 21 is a perspective view of an alternate embodiment of an amphibious vehicle in accordance with this invention.
Figure 22:
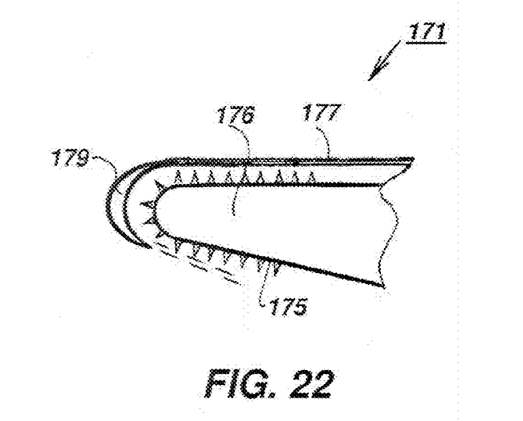
FIG. 22 is a partial simplified elevational view of a front portion of one of the tracks of the vehicle of FIG. 21 and illustrating a forward water diverter vane in a lower position.
Figure 23:
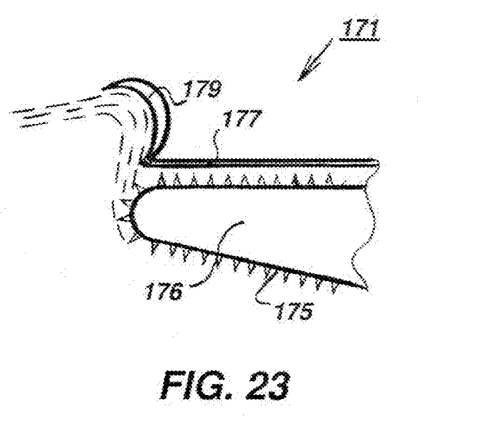
FIG. 23 is a view similar to FIG. 22, but showing the forward water diverter vane in an upper position and utilized while the vehicle is backing up in water.

An alternate embodiment of a vehicle 171 is illustrated in FIG. 21. Vehicle 171 has a hull 173 with tracks 175. The forward and rearward ends of tracks 175 extend past the forward and rearward ends of hull 173. Tracks 175 are mounted to a support frame 176 in a manner similar to the first embodiment. In this embodiment, each fender 177 is mounted to support frame 176 rather than to hull 173. Consequently, fenders 177 move upward and downward with tracks 175. Forward water diverter vane 179 and rear vanes 181 are mounted to the ends of fender 177. As shown in FIGS. 22 and 23, forward vane 179 can be pivoted to an upper position. While in the upper position in FIG. 23, forward vane 179 is out of the way for land travel. Also, while in the upper position, forward vane 179 will divert water from flowing rearward along the upper run of track 176 while vehicle 171 is backing up. Various arrangements may be employed to pivot fender 179 from the lower position FIG. 22 to the upper position of FIG. 23.

Figure 24:
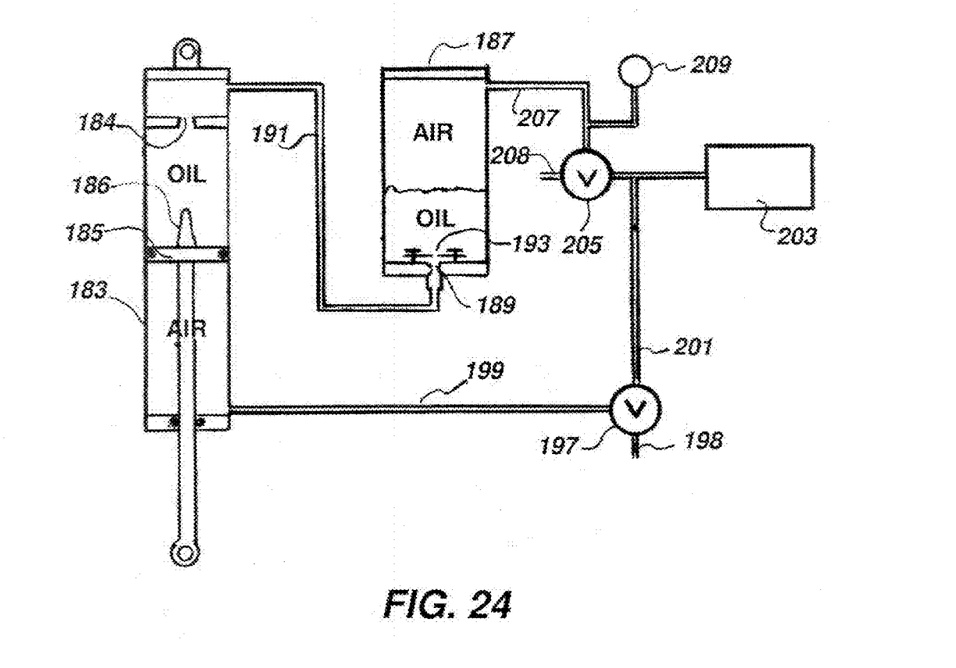
FIG. 24 is a schematic view illustrating another embodiment for raising and lowering the tracks relative to the hull of the vehicle of FIG. 1 or 21.

FIG. 24 illustrates an elevation device that will both lift and lower the tracks of vehicle of FIG. 1 or 21 rather than employing different devices for lowering and lifting the tracks as in the first embodiment. Two of the units shown in FIG. 24 will be used on each track 21 (FIG. 1). Strut cylinder 183 has a piston 185 separating cylinder 183 into oil and air chambers. Cylinder 183 may have an orifice plate 184 in the oil chamber for receiving a probe 186 on the upper end of piston 185. Orifice 184 meters the oil on the upstroke to dampen the motion and absorb energy. A line 191 leads from the upper end of strut cylinder 183 to an air/oil reservoir 187. Air/oil reservoir has a port 189 on its lower end with a movable plate 193 mounted over it. Plate 193 dampens the downstroke of strut cylinder 183. A line 199 leads from the air portion of strut cylinder 183 to a three position valve 197. One position of valve 197 is to a port 198 leading to atmosphere. A line 201 leads from valve 197 to a line connected between the output of an air compressor 203 and a three position valve 205. One of the positions of valve 205 is to a port 208 discharging to atmosphere. Valve 205 has one position connected to a line 207 that leads to the air or upper portion of reservoir 187. A gage 209 may be employed to determine the air pressure in reservoir 187.

In operation, three position valve 205 is opened to allow air supply 203 to apply air pressure to air/oil reservoir 187. Pressure gage 209 or the feel of the ride is used to obtain a pressure sufficient to support the weight of the vehicle in the full down position of the tracks. Valve 205 is then set to the closed position. Valve 197 is opened to raise the tracks to the position desired, which may be the maximum upper position or one between lower and upper. Valve 197 is then set in the closed position to maintain this nominal position. The vehicle and strut cylinder 183 will go up and down about the nominal position when passing over bumps on the land and waves on the water. Opening valve 197 to atmosphere port 198 allows the pressure in reservoir 187 to push strut piston 185 and the tracks down to a new desired position, and/or to a full down position to get a maximum ground clearance under the vehicle hull. When the strut piston 185 approaches its full up position, tapered pin 186 gradually closes off orifice 185 to attenuate the jar when hitting the stop. Strut cylinder 183 and reservoir 187 may be packaged separately as shown or they can be combined to form a single integral unit by placing reservoir 187 above cylinder 183 and/or concentrically surrounding cylinder 183.

Figure 25:
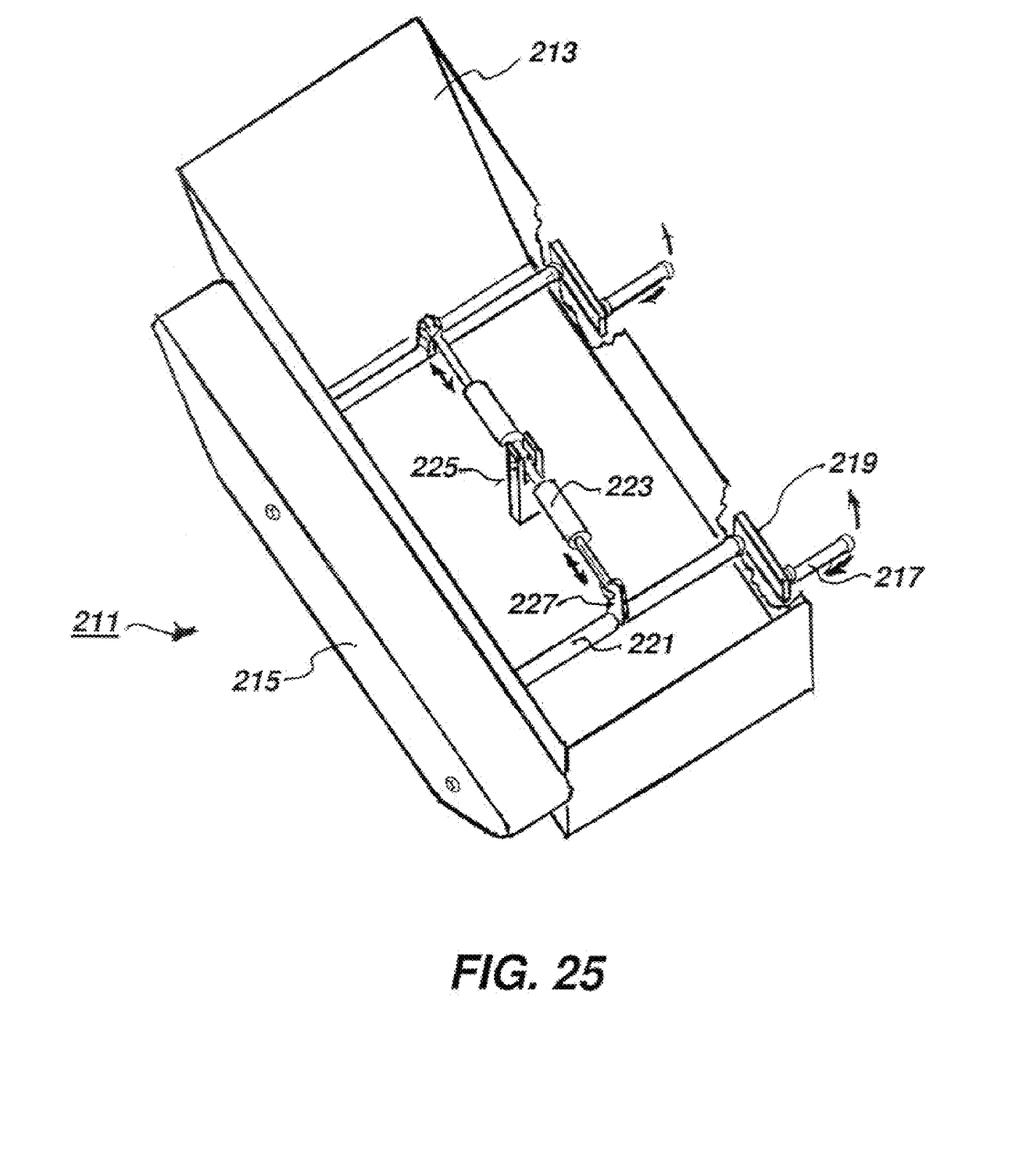
FIG. 25 is an alternate embodiment for another elevation mechanism for raising and lowering the tracks relative to the hull for the vehicle of FIG. 1 or FIG. 21.

Another embodiment for raising and lowering the tracks is illustrated by vehicle 211 in FIG. 25. Vehicle 211 has a hull 213 and two track assemblies 215 (only one shown). Track assemblies 215 may be shorter or longer than hull 213. Lift members 217 are mounted pivotally to each track assembly 215. Each lift member 217 has a lever arm 219 that connects it to a torque tube 221. Torque tubes 221 extend between tracks 215 and are rotated in unison by a driving mechanism, which in this example, comprises two end-to-end fluid cylinders 223 mounted between the forward and aft torque tubes 221. Cylinders 223 act in opposite directions and are each connected to a pedestal 225 attached to hull 213. Each cylinder 223 is connected by a bracket 227 to one of the torque tubes 221. Extending one cylinder 223 and contracting the other will cause lift arms 217 to rotate in unison to raise or lower track assembly 215. Operating cylinders 223 in the opposite direction causes the opposite rotation. Cylinders 223 could combine a shock absorbing capability as shown in FIG. 24.

Figure 26:
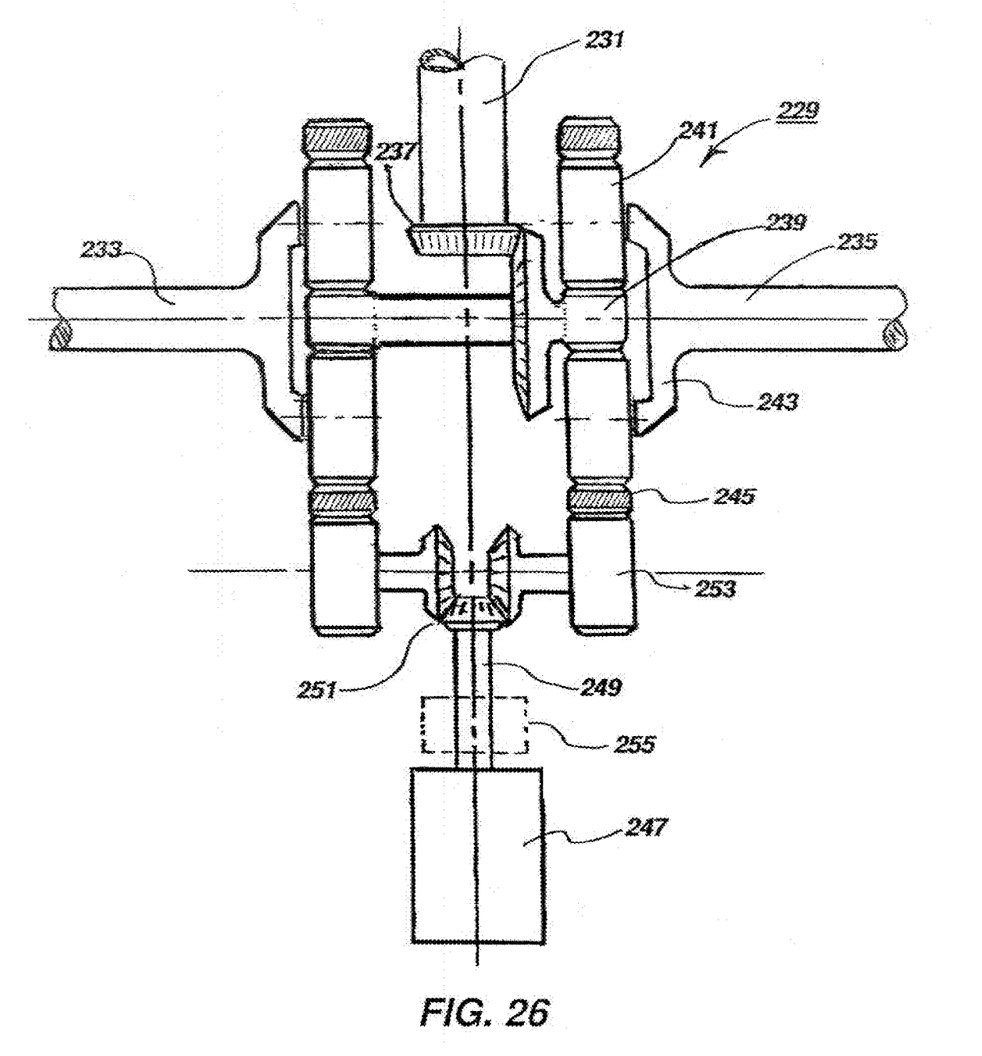
FIG. 26 is a schematic view of an alternate embodiment for steering the vehicle of FIG. 1 or the vehicle of 21, the alternate embodiment including a planetary gear arrangement.

An alternate embodiment of the steering and drive assembly 229 is shown in FIG. 26. Main drive shaft 231 from the engine or power source enters and drives a planetary gear arrangement via a bevel gear assembly 237. Each drive shaft 233 and 235 is connected to a separate sun gear 239. When rotated, each sun gear 239 rotates two or more planet gears 241. Planet gears 241 are connected to drive shafts 233 or 235 by a yoke 243. Planet gears 241 also engage a ring gear 245.

A steering motor 247, which is a hydraulic or electrical motor that receives signals from the steering wheel of the vehicle, rotates a shaft 249 in response. Shaft 249 is connected via a bevel gear arrangement to two pinion gears 253. Each pinion gear 253 engages the gear teeth on the outer side of one of the ring gears 245. An optional clutch/lock 255 may be mounted on steering shaft 249.

In the operation of the embodiment of FIG. 26, when the steering wheel is held stationary, shaft 249 will not rotate. Power shaft 231 will rotate drive shafts 233 and 235 in unison, causing the tracks to move in unison and the vehicle to move in a straight line. When a steering signal is received by steering motor 247, it rotates pinions 253, one in one direction and the other in the other direction. This causes one of the ring gears 245 to rotate in the opposite direction to the other. As a result, the speed of the planet gears 241 will rotate at different speeds causing one of the drive shafts 235 to rotate at a different speed or even in an opposite direction to the other drive shaft 233.

While the invention has been shown in a number of its forms, it should be apparent to those skilled in the art that it is not so limited but is susceptible to various changes without departing from the scope of the claims.

The invention claimed is:

1. An amphibious vehicle comprising:
a hull;
tracks, which operate as the sole source of propulsion on land and in water;
a forward water diverter vane mounted adjacent and forward of a forward portion of each of the tracks, the forward water diverter vane having a rearward facing curved recess that diverts in a rearward direction water thrown by the forward portion of each of the tracks while the vehicle is moving forward; and
an aft water diverter vane mounted above and rearward of each of the tracks, each of the aft water diverter vanes having a lower surface that inclines upwardly from a forward end to a rearward end of the aft water diverter vane, the forward end of each of the of aft water diverter vanes being located adjacent an upper rearward portion of one of the tracks for diverting in a rearward direction water thrown by the upper rearward portion of the tracks while the vehicle is moving forward.

2. The vehicle according to claim 1, further comprising:
a track support frame connected to the hull, each of the tracks extending around the track support frame; and
a plurality of shock absorbers mounted between the track support frame that attenuate jarring motion on the hull when going over bumps and impacting waves.

3. The vehicle according to claim 1, further comprising:
a support structure for each of the tracks;
tie rods attaching the support structure for each of the tracks to the hull and permitting up and down motion of the tracks relative to the hull.

4. The vehicle according to claim 1, further comprising:
a transom flap pivotally mounted behind the hull;
a tilt mechanism connected between a transom of the hull and the transom flap, the tilt mechanism being capable of tilting the transom flap from an operational position to a storage position; and
a trim adjuster that adjusts the position of the transom flap while in the operational position.

5. The vehicle according to claim 1, further comprising:
a rearward facing step shoulder on a bottom of the hull between forward and aft ends of the hull, the step shoulder being rearward of a center of gravity of the vehicle.

6. The vehicle according to claim 1, wherein the lower run of each of the tracks has a planar central portion adapted to contact the ground, and planar forward and aft portions extending from opposite ends of the central portion at angles between 1 and 3 degrees.

7. The vehicle according to claim 6, wherein the central portion has a length less than one-half a total length from a forward end of the forward portion to an aft end of the aft portion.

8. An amphibious vehicle comprising:
a hull;
tracks, which operate as the sole source of propulsion on land and in water;
a forward water diverter vane mounted adjacent and forward of a forward portion of each of the tracks, the forward water diverter vane having a rearward facing curved recess that diverts in a downward and rearward direction water thrown by the forward portion of each of the tracks while the vehicle is moving forward; and
wherein the forward water diverter vane is pivotal between a rearward position when the vehicle is backing and a forward position when the vehicle is moving forward.

9. An amphibious vehicle comprising:
a hull;
tracks movable relative to the vehicle, the tracks operating as the sole source of propulsion on land and in water;
a forward water diverter vane mounted adjacent and forward of a forward portion of each of the tracks, the forward water diverter vane having a rearward facing curved recess that diverts in a downward and rearward direction water thrown by the forward portion of each of the tracks while the vehicle is moving forward,
wherein the tracks have a lower run and an aft run that is at an angle relative to the lower run, and the vehicle further comprises:
a cavitation plate mounted directly behind a lower end of the aft run of each of the tracks and below the waterline of the hull for stripping water from the lower run of the tracks as the tracks propel the vehicle forward in water.

10. The vehicle according to claim 9, further comprising:
an elevation device connected between the hull and the tracks, the elevation device being capable of moving the tracks between an upper and a lower position relative to the hull, wherein during the upper position, the lower run of each of the tracks will be below a waterline of the hull for propelling the vehicle across water.

11. An amphibious vehicle, comprising:
a buoyant hull;
first and second tracks, one on each side of the hull;
first and second drive shafts in cooperative engagement with the first and second tracks, respectively;
a power source coupled to the drive shafts for rotating the drive shafts;
a steering control device for gripping by a driver;
a steering assembly between the steering control device and the drive shafts for selectively rotating one of the tracks faster than the other of the tracks in response to rotation of the steering control device to steer the vehicle;
an elevation device connected between the hull and the tracks, the elevation device being capable of moving the tracks relative to the hull between a lower position for ground travel and an upper position for propelling the hull in water; and wherein the elevation device comprises:
a plurality of air actuated shock absorbers connected between the hull and support structure for the tracks, the shock absorbers when supplied with air pressure lifting the tracks relative to the hull.

12. The vehicle according to claim 11, wherein the steering assembly comprises:
   first and second brakes on the first and second drive shafts, respectively;
   a steering shaft that is rotated by the steering control device;
   a cam on the steering shaft;
   first and second cam followers that engage the cam;
   a first master cylinder leading to the first brake and operated by movement of the first cam follower; and
   a second master cylinder leading to the second brake and operated by movement, of the second cam. follower.

13. The vehicle according to claim 11, further comprising:
   a main drive shaft connected between the power source and a differential, the differential in engagement with the first and second drive shafts; and
   a third brake that engages the main drive shaft.

14. The vehicle according to claim 11, wherein the elevation device further comprises:
   a plurality of air cylinders connected between the hull and the support structure, which when supplied with air pressure, lower the tracks relative to the hull.

15. The vehicle according to claim 11, further comprising:
   a set of end bogie wheels mounted to support structure of each of the tracks around which an end of each of the tracks turns;
   a tie rod and a turn buckle connected between the support structure and each of the sets of end bogie wheels for moving the set selectively forward and aft relative to the support structure; and
   a torque tube with connecting turnbuckles to the end bogie wheels to keep the track in alignment.

16. The vehicle according to claim 11, further comprising:
   a support structure for each of the tracks; and
   tie rods attaching the support structure for each of the tracks to the hull and permitting up and down motion of the tracks relative to the hull.

17. An amphibious vehicle, comprising:
   a buoyant hull;
   a pair of driven tracks, one on each side of the hull for propelling the vehicle while in water and also while on land; and
   an aft water diverter vane mounted above and rearward of each of the tracks, each of the aft water diverter vanes having a lower surface that inclines upwardly from a forward end to a rearward end of the aft water diverter vane, the forward end of each of the aft water diverter vanes being located adjacent an upper rearward portion of one of the tracks for diverting in a rearward direction water thrown by the upper rearward portion of the tracks while the vehicle is moving forward.

18. The vehicle according to claim 17, further comprising:
   a power source;
   first and second drive shafts for driving the tracks;
   a steering control device for slowing one track down relative to the other track for steering, on water and on land;
   a planetary gear arrangement between the power source and the first and second drive shafts; and
   a steering motor that is coupled to the planetary gear arrangement, the steering motor receiving signals from the steering control device.

19. The vehicle according to claim 17, further comprising:
   support structures around which the tracks rotate;
   a plurality of air and oil shock absorbers connected between the hull and the support structures, which can raise and lower the tracks relative the hull.

20. The vehicle according to claim 17, wherein the elevation device comprises:
   support structures around which the tracks rotate;
   first and second crank arms attached to the support structures;
   a torque tube extending between the first and second crank arms; and
   a driving mechanism coupled to the torque tube for selectively rotating the torque tube, which in turn rotates the crank arms to raise and lower the tracks relative to the hull.

21. The vehicle according to claim 17, wherein each of the aft water diverters has a curved protruding upper side extending from the forward end of the aft water diverter vane to the rearward end of the aft water diverter vane, each of the aft water diverter vanes being positioned so that water thrown by the upper rearward portion of each of the tracks while the vehicle is moving forward passes over the curved protruding upper side.

22. The vehicle according to claim 21, further comprising:
   a curved recess on the vehicle spaced above the curved protruding upper side of each of the aft water diverter vanes, each of the curved recesses having a curvature that is the same as a curvature of the curved protruding upper sides, defining a slot for water thrown by the upper rearward portion of the tracks to pass through.

23. The vehicle according to claim 17, further comprising:
   a transom flap pivotally mounted behind the hull;
   a tilt mechanism connected between a transom of the hull and the transom flap, the tilt mechanism being capable of tilting the transom flap from an operational position to a storage position; and
   a trim adjuster that adjusts the position of the transom flap while in the operational position.

24. The vehicle according to claim 17, further comprising:
   a rearward facing step shoulder on a bottom of the hull between forward and aft ends of the hull, the step shoulder being located aft of a center of gravity of the vehicle.

25. The vehicle according to claim 17, wherein the lower run of each of the tracks has a planar central portion adapted to contact the ground, and planar forward and aft portions extending from opposite ends of the central portion at angles between 1 and 3 degrees.

26. The vehicle according to claim 25, wherein the central portion has a length less than one-half a total length from a forward end of the forward portion to an aft end of the aft portion.

27. An amphibious vehicle, comprising:
   a buoyant hull;
   a pair of driven tracks, one on each side of the hull for propelling the vehicle while in water and also while on land, each track having a lower portion and an aft portion that is at an angle relative to a waterline of the hull; and
   a cavitation plate mounted directly behind a lower end of the aft portion of each of the tracks and below the waterline of the hull for stripping entrained water from the lower portion of the tracks as the tracks propel the vehicle in a forward direction in water.

28. The vehicle according to claim 27, wherein the cavitation plate is movable between a lower position while the vehicle is moving in water and an upper position while the vehicle is on land.

29. The vehicle according to claim 27, wherein:
   the lower portion of each of the tracks has a lower central portion, and the aft portion of each of the tracks has a lower aft portion sloping upward from the lower central portion at a first angle relative to the waterline of the hull and an upper aft portion sloping upward from the lower aft portion at a second angle relative to the waterline of the hull, the second angle being greater than the first angle; and the cavitation plate is located adjacent an intersection between the lower aft portion and upper aft portion.

30. The vehicle according to claim 27, further comprising:

an elevation device connected between the hull and the tracks, the elevation device being capable of moving the tracks between an upper and a lower position relative to the hull, wherein during the upper position, a lower run of each of the tracks will be below a waterline of the hull for propelling the vehicle across water.

31. The vehicle according to claim 27, further comprising:

a transom flap pivotally mounted behind the hull above the cavitation plate.

\* \* \* \* \*